Jan. 5, 1937.  C. C. FUERST  2,066,563
CAMERA CONSTRUCTION
Filed Oct. 25, 1935
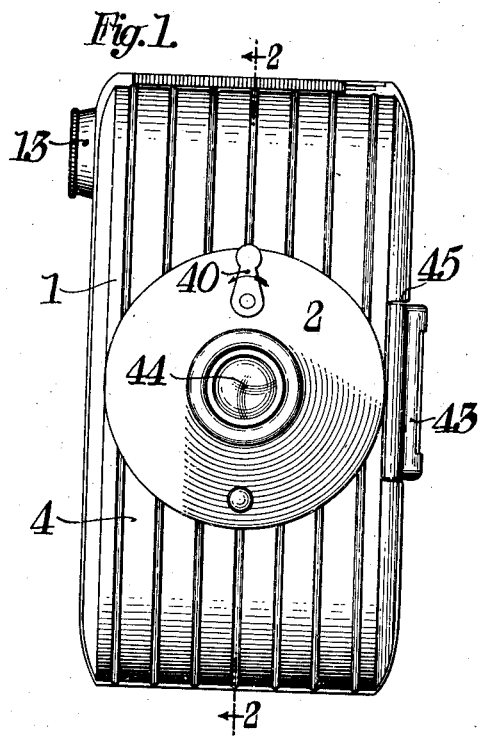
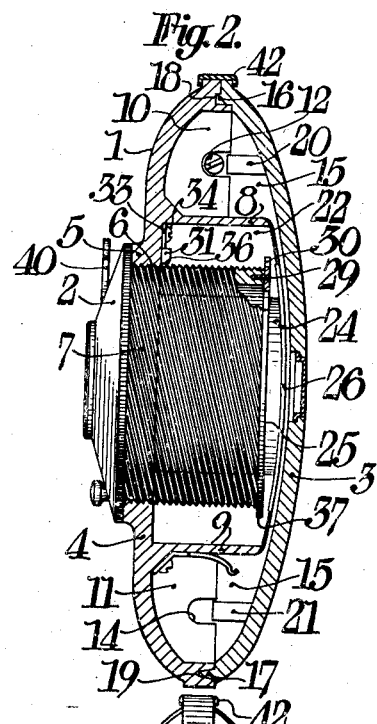
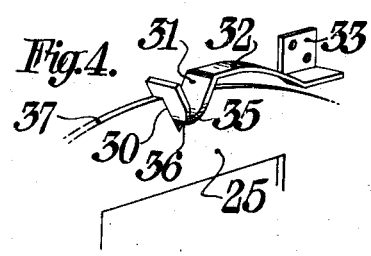
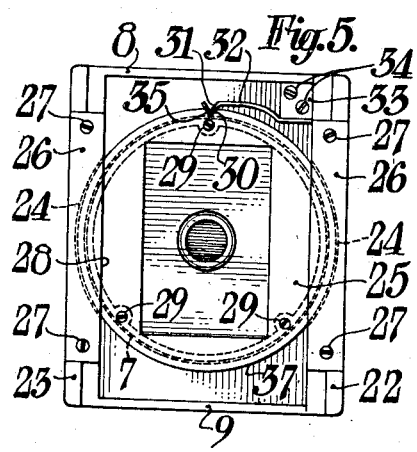
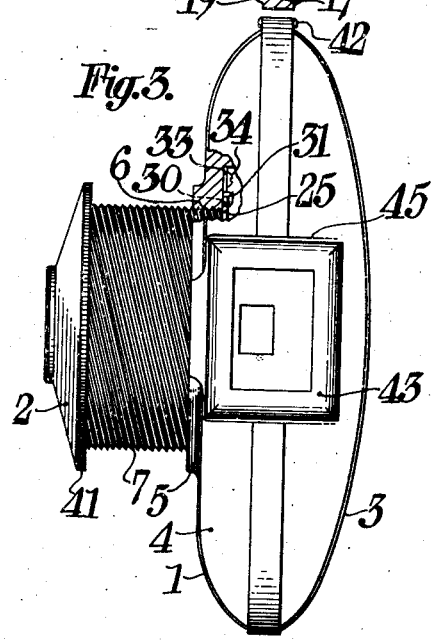
INVENTOR:
Carl C. Fuerst,
BY
ATTORNEYS.

Patented Jan. 5, 1937

2,066,563

UNITED STATES PATENT OFFICE 2,066,563

CAMERA CONSTRUCTION

Carl C. Fuerst, Rochester, N. Y., assignor, by mesne assignments, to Eastman Kodak Company, Jersey City, N. J., a corporation of New Jersey Application October 25, 1935, Serial No. 46,768

11 Claims. (Cl. 95—31)

This invention relates to photography, and more particularly to collapsible folding cameras. One object of my invention is to provide an inexpensive folding camera adapted to be made of moldable material. Another object of my invention is to provide a camera construction permitting two relatively movable parts to telescope a sufficient distance so that an objective of relatively long focal length may be employed. Another object of my invention is to provide a satisfactory latching mechanism by which the camera parts may be accurately and definitely held in a picture-taking position. Another object of my invention is to provide a camera with an exposure frame so shaped that the maximum movement is obtainable by the relatively movable parts of the camera. Still another object of my invention is to provide a camera which can be readily made of moldable parts and in which the parts are so arranged that they may be easily assembled and held in assembled relation and other objects will appear from the following specification, the novel features being particularly pointed out in the claims at the end thereof.

Coming now to the drawing wherein like reference characters denote like parts throughout.

Figure 1 is a front elevation of a camera constructed in accordance with and embodying a preferred form of my invention.

Figure 2 is a section taken on line 2—2 of Figure 1, with the camera parts in a collapsible or folded position.

Figure 3 is a side elevation of the camera shown in Figure 1, but with a small portion broken away and shown in section.

Figure 4 is an enlarged fragmentary detail of the latch mechanism used in the camera shown in the preceding figure, and Figure 5 is a plan view of the exposure frame and associated parts with the rest of the camera broken away.

In accordance with my invention, I may provide a camera having a body portion, supporting a collapsible portion or camera front 2 and a removable camera back 3. The camera body 1 may be provided with a front wall 4 having an annular extension 5, including a threaded opening 6 for the reception of a threaded tubular extension 7, forming a part of the camera front 2.

Extending rearwardly from the front wall 4 are walls 8 and 9 which define parts of the spool chambers 10 and 11. These spool chambers may be provided with the usual film spool supports—that is, chamber 10 may be provided with a winding key 12 which is affixed to the winding knob 13 on the outside of the camera and spool chamber 11 may be provided with a notch 14 for supporting a film spool trunnion.

The camera back 3 includes walls 15, which have a tongue and groove connection as indicated across the ends at 16 and 17, with the grooved ends 18 and 19 of the camera body. Thus, a light tight connection is formed between the camera body and back.

The camera back is provided with a pair of posts 20 and 21, adapted to hold film spool trunnions in the spool chambers in a known manner.

On the camera body 1 connecting the walls 8 and 9, are a pair of side walls 22 and 23, these walls are best indicated in Figure 5, being considerably heavier than the end walls 8 and 9. The walls 8, 9, 22 and 23 define a box-like structure which encloses the threaded tubular member 7, when the camera is in a folded position as shown in Figure 2.

In order to obtain a maximum clearance in the camera body, there are similar arcuate cut-out portions 24 forming recesses in each of the side walls 22 and 23, the purpose of these cut-out portions being to permit the circular plate 25 to move back and forth as the threaded member 7 is screwed into and out of the threaded opening 6 in the camera body. In addition, clearance is obtained by providing similar curved rails 26, which are of comparatively thin material and which bridge over the arcuate recesses 24, to form side members defining the exposure apertures designated broadly as 28. The rails 26 may be attached to the walls 22 and 23 by screws 27 as shown.

It should be noted that the top surfaces of the rails 26 are arcuate or curved, closely following the curvature of the camera back 3. This has two advantages. First, the film is curved to more nearly correspond with the field of the simple type lens used with this camera, and second, it gives more space in the camera body beneath the exposure frame 28 for the camera extension 7 to move into.

It is necessary to hold the camera front 2 rigidly in an operative or picture-taking position as shown in Figure 3. In order to do this, I have attached the plate 25, by means of screws 29 to the tubular threaded member 7. This plate is provided with a V-shaped notch 30, as best shown in Figure 4, and I have provided a hook member 31 on the end of a spring 32 to engage this notch, the notch 30 and the hook 31 forming a latch adapted to hold the parts rigidly in position.

The spring arm 32 may be attached to the camera by means of the flange 33 through which screws 34 may pass.

It should be noted that the lower part of the hook 31 is provided with a bevelled edge 35, forming a cam surface. The object of this cam surface is as follows:

When the threaded member 7 is in the position shown in Figure 2, the bottom edge 36 of the hook may ride along the tops of the threaded area, the width of the hook along the bottom edge 36 being preferably somewhat greater than the distance between two of the threads on the camera front 2. When, however, the camera front 2 has nearly reached the position shown in Figure 3, the latch may be cammed up on the periphery 37 of plate 25, on which the latch will ride until the notch 30 is reached, at which place the hook will drop down into the notch and definitely locate the plate in position. This preferably occurs when the plate rests against the front wall 4 of the camera body and when so latched in its operative position the camera is rigidly extended and will be held against movement.

While the shutter structure itself forms no part of the present invention and is enclosed in the front portion of the camera front 2, I have found it desirable to utilize a trigger 40 for the shutter which is adapted to turn in the direction shown by the arrow in Figure 1 to make an exposure. The reason for this is that the direction of rotation of the camera front relative to the camera body on the threads 6 and 7 is in the same direction that the trigger is turned to make an exposure. Consequently, when an exposure is made, the tendency to turn the camera front 2 by means of pressure on the trigger will only tend to more tightly lock the camera front in its extended position. Whereas, if the shutter trigger should be made to operate in an opposite direction, there might be some tendency to release the spring latch 31 which holds the camera front in an extended position.

I preferably serrate or roughen the edge 41 of the camera front 2 so that it may be readily turned to collapse the camera body and to position the front for taking pictures more readily. The camera may also be provided with a latch member 42 for holding the camera back on the body and with a usual type of finder 43 which may fold flat in a recess 45 in a side wall of the camera. The camera front 2 may also carry an objective 44 in the usual manner.

I am aware that cameras have been previously suggested in which the camera front may move on one or more threaded extensions relative to the camera body for positioning the parts for taking pictures, and do not claim this structure broadly, but only as defined in the following claims.

Having now described my invention what I desire to secure by Letters Patent of the United States and what I claim is:

1. In a folding camera, the combination with a camera body including a threaded aperture in a front wall thereof, of a notched movable camera front including a threaded extension adapted to screw in the threaded aperture of the camera body, a spring latch mounted on the camera body adjacent the threaded aperture therein and adapted to engage the notch of the movably mounted camera front to hold said front in a predetermined position.

2. In a folding camera, the combination with a camera body including a threaded aperture in a front wall thereof, of a notched movable camera front including a threaded extension adapted to screw in the threaded aperture of the camera body, a spring latch mounted on the inside of the front wall of the camera body and adapted to engage the notch of the movably mounted camera front to hold said front in a predetermined position.

3. In a folding camera, the combination with a camera body, including a threaded aperture in a front wall thereof, of a threaded front member adapted to be screwed into the threaded body, a flange on the front member limiting its movement with respect to the body in one direction, a latch carried by the camera body and adapted to engage said flange when said front is in a predetermined position, co-operating parts on the latch and flange being adapted to retain the front in a pre-determined position.

4. In a folding camera, the combination with a camera body, including a threaded aperture in a front wall thereof, of a threaded front member adapted to be screwed into the threaded body, a flange on the front member limiting its movement with respect to the body in one direction, a latch carried by the camera body adapted to engage the flange, a notch in the flange for receiving the latch member, and means for camming the latch up on the flange before it reaches the notch.

5. In a folding camera, the combination with a camera body, including a threaded aperture in a front wall thereof, of a threaded front member adapted to be screwed into the threaded body, a flange on the front member limiting its movement with respect to the body in one direction, a latch carried by the camera body including a hook member and a cam surface, said flange including a notch adapted to be engaged by the hook for positioning the camera front relative to the camera body, said camera front flange when turned on the threaded connection between the camera front and body being adapted to engage the cam surface on the hook to cam it up on the periphery of the flange, whereby it may drop down into the notch to hold the parts in a pre-determined position.

6. In a folding camera, the combination with a camera body having a threaded aperture in a front wall thereof, of a camera front movably mounted on the camera body and carrying a thread adapted to engage the threaded opening of the camera body, a frame carried by the camera body including side walls adapted to support side members defining the exposure area, arcuate recesses in the side walls between which the threaded camera front may move, said side members comprising plates attached to said side walls and spanning the arcuate recesses forming the sides of the exposure frame.

7. In a folding camera, the combination with a camera body having a threaded aperture in a front wall thereof, of a camera front movably mounted on the camera body and carrying a thread adapted to engage the threaded opening of the camera body, a frame carried by the camera body including four walls extending rearwardly from the camera body and enclosing the threaded aperture therein, at least two of the walls including facing arcuate recesses between which the threaded camera front may move, and plates covering the arcuate recesses and forming with two of the four walls a frame defining an exposure area.

8. In a folding camera, the combination with a camera body having a threaded aperture in a front wall thereof, of a camera front movably mounted on the camera body and carrying a thread adapted to engage the threaded opening of the camera body, a frame carried by the camera body including four walls extending rearwardly from the camera body and enclosing the threaded aperture therein, at least two of the walls including facing arcuate recesses between which the threaded camera front may move, and plates covering the arcuate recesses and forming with two of the four walls a frame defining an exposure frame, said plates being curved and of thin material whereby a relatively large movement of the camera front relative to the camera body can take place.

9. In a folding camera, the combination with a camera body having a threaded aperture in a front wall thereof, of a camera front movably mounted on the camera body and including a threaded tubular member adapted to screw into the threaded aperture in the camera body said tubular member including a front face extending out beyond the threaded tubular member forming one flange, an apertured plate carried by the opposite end of the tubular member extending beyond the threaded tubular member forming a flange therewith, whereby the threaded areas on the camera and tubular member permit the camera parts to move to a picture taking or folded position, and the flanges limit the movement of the tubular member relative to the camera body in both directions.

10. In a folding camera, the combination with a camera body having a threaded aperture in a front wall thereof, of a camera front movably mounted on the camera body and including a threaded tubular member adapted to screw into the threaded aperture in the camera body, flanges on each end of the threaded tubular member of greater diameter than the tubular member for limiting the movement of the threaded tubular member in two directions, a latch element on the camera body and a latch element on a flange adapted to engage and hold the parts in a picture taking position.

11. In a folding camera, the combination with two relatively movable parts, of one part constituting a camera body, an annular flange carried by the camera body, an internal thread on the flange, the other part constituting a tubular member including an exterior threaded portion adapted to engage the internally threaded annular camera flange, and projections carried on each end of the tubular camera part adapted to engage walls of the annular flange carried by the camera body for limiting the movement of the tubular member in two directions.

CARL C. FUERST.